United States Patent
Zhang

(10) Patent No.: US 11,645,220 B2
(45) Date of Patent: May 9, 2023

(54) METHOD AND APPARATUS FOR MULTI-BUS DEVICE FUSED ACCESS

(71) Applicant: INSPUR SUZHOU INTELLIGENT TECHNOLOGY CO., LTD., Jiangsu (CN)

(72) Inventor: Yijie Zhang, Jiangsu (CN)

(73) Assignee: INSPUR SUZHOU INTELLIGENT TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 17/786,363

(22) PCT Filed: Aug. 26, 2020

(86) PCT No.: PCT/CN2020/111233
§ 371 (c)(1),
(2) Date: Jun. 16, 2022

(87) PCT Pub. No.: WO2021/120674
PCT Pub. Date: Jun. 24, 2021

(65) Prior Publication Data
US 2023/0020988 A1    Jan. 19, 2023

(30) Foreign Application Priority Data
Dec. 18, 2019  (CN) .................... 201911306659.9

(51) Int. Cl.
*G06F 13/14* (2006.01)
*G06F 13/40* (2006.01)
*G06F 13/42* (2006.01)

(52) U.S. Cl.
CPC ...... *G06F 13/4004* (2013.01); *G06F 13/4282* (2013.01)

(58) Field of Classification Search
None
See application file for complete search history.

(56) References Cited

U.S. PATENT DOCUMENTS

| 2008/0168475 A1 | 7/2008 | De Cesare et al. |
| 2014/0046535 A1* | 2/2014 | Hinnant, Jr. ........... G01C 21/20 701/34.4 |

(Continued)

FOREIGN PATENT DOCUMENTS

| CN | 101252779 A | 8/2008 |
| CN | 103325124 A | 9/2013 |

(Continued)

OTHER PUBLICATIONS

International Search Report of corresponding PCT application PCT/CN2020/111233, dated Dec. 1, 2020, 6 pages.

(Continued)

*Primary Examiner* — Henry Tsai
*Assistant Examiner* — Dean Phan
(74) *Attorney, Agent, or Firm* — Cooper Legal Group, LLC

(57) ABSTRACT

Provided are a method and apparatus for multi-bus device fused access. The method includes: receiving, by a bus, an instruction for accessing a fused node of a device, which instruction containing a matching word, an initial address, and an offset; performing matching according to the matching word and activating a fused drive; acquiring, by the fused drive, the initial address and the offset from the instruction on the bus respectively; computing an address of a first bus of the device according to the initial address, and computing an address of a second bus of the device according to the initial address and the offset; and accessing the device according to the address of the first bus so as to acquire first information, and accessing the device according to the address of the second bus so as to acquire second information.

20 Claims, 2 Drawing Sheets

(56) References Cited

U.S. PATENT DOCUMENTS

| | | | |
|---|---|---|---|
| 2015/0331422 A1 | 11/2015 | Hartung et al. | |
| 2018/0288096 A1* | 10/2018 | Cullari | H04L 63/102 |
| 2019/0138308 A1* | 5/2019 | Robinson | G06F 9/30105 |
| 2020/0226077 A1* | 7/2020 | Kang | G06F 13/1668 |

FOREIGN PATENT DOCUMENTS

| | | | |
|---|---|---|---|
| CN | 103944895 A | 7/2014 | |
| CN | 106383569 A | 2/2017 | |
| CN | 108287804 A | 7/2018 | |
| CN | 108829624 A | 11/2018 | |
| CN | 109542825 A | 3/2019 | |
| CN | 110365567 A | 10/2019 | |
| CN | 111177046 A | 5/2020 | |
| WO | 2015165232 A1 | 11/2015 | |

OTHER PUBLICATIONS

Written Opinion of International Searching Authority of corresponding PCT application PCT/CN2020/111233, dated Dec. 1, 2020, 9 pages.

First Office Action of corresponding CN priority application CN201911306659.9, dated Jan. 15, 2021, 14 pages.

Second Office Action of corresponding CN priority application CN201911306659.9, dated Aug. 5, 2021, 11 pages.

* cited by examiner

METHOD AND APPARATUS FOR MULTI-BUS DEVICE FUSED ACCESS

This application claims priority to Chinese Patent Application No. 201911306659.9, filed on Dec. 18, 2019, in China National Intellectual Property Administration and entitled "Method and Apparatus for Multi-Bus Device Fused Access", the contents of which are hereby incorporated by reference in its entirety.

FIELD

The present application relates to the technical field of bus, and more particularly to a method and apparatus for multi-bus device fused access.

BACKGROUND

With the development of embedded technologies, various program standards have been proposed. The standard of a program contributes to improving the development efficiency as well as the readability and maintainability of the program. When a novel Voltage Regulator (VR) chip (a power control chip that controls powering by Pulse Width Modulation (PWM) frequency modulation) uses a Power Management Bus (PMBUS) as a management bus, a state management and control register and version information register thereof are separated. In other words, there are two communication lines in a chip: a PMBUS and a conventional Inter-Integrated Circuit (I2C) bus. The PMBUS includes most of power control registers needed by all upper-layer controllers. The I2C bus includes some other information, such as manufacturer information and VR version information, and the upper-layer controllers generally do not need such information. However, some of information in the I2C bus is discarded as needed by a product. As a result, the workload is increased, and additional work is needed to achieve a correspondence between information of two nodes, which is unfavorable for subsequent development and maintenance.

Currently, for all devices, the most standard method is configuring the devices in a device tree according to attributes of the devices. This method is convenient, and an interconnection relationship between the devices may be obtained conveniently. For PMBUS and I2C, a node including a configuration word (matching word) and an address may be configured in the device tree. A VR chip with multiple addresses may generally be regarded as two devices in the device tree. However, the information in the I2C bus is generally used not so commonly, and only individual information therein is discarded as needed in most cases. In such case, if a dedicated node is constructed, there may be too many nodes, and adverse effects are brought to subsequent development.

Therefore, based on the above situation, it is necessary to propose an optimal access method, to ensure that the same device is no more regarded as two devices in a device tree of a bus and desired information may be obtained from different links respectively through an instruction for accessing a single node.

SUMMARY

Based on the above objective, in an aspect, the present application discloses a method for multi-bus device fused access, including following steps:

receiving, by a bus, an instruction for accessing a fused node of a device, wherein the instruction containing a matching word, an initial address, and an offset;

performing matching according to the matching word and activating a fused drive;

acquiring, by the fused drive, the initial address and the offset from the instruction on the bus respectively;

computing an address of a first bus of the device according to the initial address, and computing an address of a second bus of the device according to the initial address and the offset; and accessing the device according to the address of the first bus so as to acquire first information, and accessing the device according to the address of the second bus so as to acquire second information.

According to an embodiment of the method for multi-bus device fused access of the present application, the address of the first bus is an I2C bus address of the device, and the address of the second bus is a PMBUS address of the device.

According to an embodiment of the method for multi-bus device fused access of the present application, the step of performing matching according to the matching word and activating the fused drive further includes:

matching the fused drive from multiple drives of the bus according to the matching word, and activating an adapter of the fused drive to associate the bus with the first bus and the second bus.

According to an embodiment of the method for multi-bus device fused access of the present application, the step of acquiring, by the fused drive, the initial address and the offset from the instruction on the bus respectively further includes:

acquiring the initial address and the offset from the bus according to a structure specified in the fused drive respectively; and writing the acquired initial address and the acquired offset to corresponding positions of the structure.

According to an embodiment of the method for multi-bus device fused access of the present application, the step of computing the address of the first bus of the device according to the initial address and computing the address of the second bus of the device according to the initial address and the offset further includes:

assigning a value of the initial address to the address of the first bus; and assigning a value of the initial address plus the offset to the address of the second bus.

In another aspect, the present application also discloses an apparatus for multi-bus device fused access, including:

at least one processor; and a memory, storing a program instruction executable by the processor. The program instruction is executed by the processor to implement following steps:

receiving, by a bus, an instruction for accessing a fused node of a device, wherein the instruction containing a matching word, an initial address, and an offset;

performing matching according to the matching word and activating a fused drive;

acquiring, by the fused drive, the initial address and the offset from the instruction on the bus respectively;

computing an address of a first bus of the device according to the initial address, and computing an address of a second bus of the device according to the initial address and the offset; and accessing the device according to the address of the first bus so as to acquire first information, and accessing the device according to the address of the second bus so as to acquire second information.

According to an embodiment of the apparatus for multi-bus device fused access of the present application, the address of the first bus is an I2C bus address of the device, and the address of the second bus is a PMBUS address of the device.

According to an embodiment of the apparatus for multi-bus device fused access of the present application, the step of performing matching according to the matching word and activating the fused drive further includes:

matching the fused drive from multiple drives of the bus according to the matching word, and activating an adapter of the fused drive to associate the bus with the first bus and the second bus.

According to an embodiment of the apparatus for multi-bus device fused access of the present application, the step of acquiring, by the fused drive, the initial address and the offset from the instruction on the bus respectively further includes:

acquiring the initial address and the offset from the bus according to a structure specified in the fused drive respectively; and writing the acquired initial address and the acquired offset to corresponding positions of the structure.

According to an embodiment of the apparatus for multi-bus device fused access of the present application, the step of computing an address of a first bus of the device according to the initial address and computing an address of a second bus of the device according to the initial address and the offset further includes:

assigning a value of the initial address to the address of the first bus; and assigning a value of the initial address plus the offset to the address of the second bus.

With the above technical solution, the present application at least has the following beneficial effects. I2C and PMBUS link addresses of a VR chip are fused together by use of an initial address and an offset, and a correspondingly developed fused drive ensures that the same device is only regarded as one device in a device tree of a bus and that desired information is obtained from different links respectively through an instruction for accessing a single node, i.e., a single device in the device tree of the bus.

Each aspect of embodiments provided in the present application should not be used to limit the scope of protection of the present application. Other embodiments conceivable according to the technology described herein become apparent to those ordinarily skilled in the art upon studying the following drawings and specific embodiments, and these embodiments are intended to be included in the scope of the present application.

More detailed explanations and descriptions are made below to the embodiments of the present application with reference to the drawings, but should not be explained as limitations on the present application.

BRIEF DESCRIPTION OF THE DRAWINGS

In order to describe the technical solutions of the embodiments of the present application more clearly, the drawings required to be used in descriptions about the prior art and the embodiments will be introduced briefly below. The components in the drawings are not necessarily drawn to scale, and related components may be omitted, or may already be scaled up in some cases, so as to emphasize and illustrate clearly novel features described herein. In addition, as known in this art, the structure may be arranged in different sequences.

DETAILED DESCRIPTION

Figure 1:
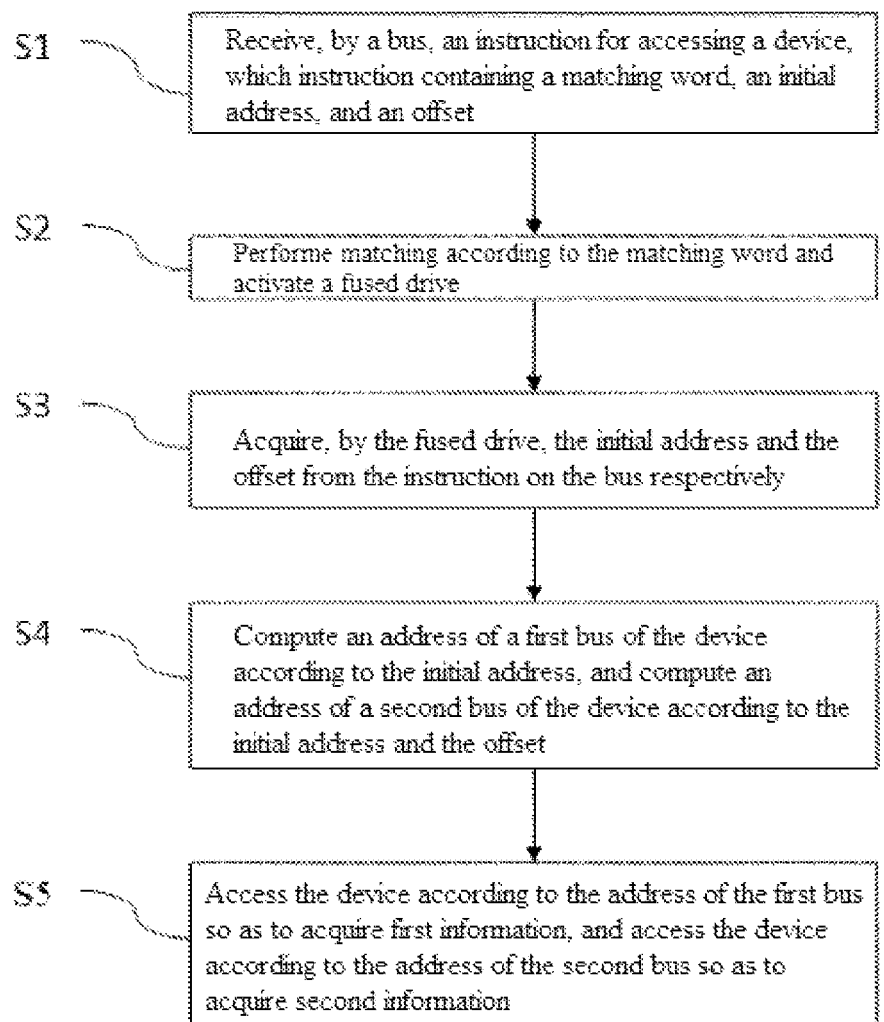
FIG. 1 is a schematic block diagram of an embodiment of a method for multi-bus device fused access according to the present application.

Although the present application may be implemented in various forms, some exemplary and nonrestrictive embodiments are shown in the drawings and will be described hereinafter. However, it is to be understood that the present disclosure will be regarded as an example of the present application and is not intended to limit the present application to the described specific embodiments.

In the following descriptions about the embodiments of the present application, it is to be noted that, if there is no special statement, the serial number of the mentioned step is only for indicating the step easily and clearly and not intended to limit the sequence of the step.

FIG. 1 is a schematic block diagram of an embodiment of a method for multi-bus device fused access according to the present application. In the embodiment shown in FIG. 1, the method at least includes the following steps.

In S1, a bus receives an instruction for accessing a fused node of a device, wherein the instruction containing a matching word, an initial address, and an offset.

In S2, matching is performed according to the matching word, and a fused drive is activated.

In S3, the fused drive acquires the initial address and the offset from the instruction on the bus respectively.

In S4, an address of a first bus of the device is computed according to the initial address, and an address of a second bus of the device is computed according to the initial address and the offset.

In S5, the device is accessed according to the address of the first bus so as to acquire first information, and the device is accessed according to the address of the second bus so as to acquire second information.

As mentioned above, a power control register and version information register of an existing VR chip are set under PMBUS and an I2C links respectively. For conventional strategies for link access, control, etc., it is necessary to construct nodes for the two links respectively. However, constructing an I2C node for a version number is quite wasteful apparently and not in line with the industry norm. In addition, the two links actually correspond to the same chip. Moreover, the two sets of communication protocols I2C and PMBUS are relatively high in similarity, and thus the two links may completely be fused into one node. This fused node includes a register of state information for monitoring, such as a monitored voltage, current, and temperature, and further includes a register of needed version information. As such, additional code overhead may be avoided. To this end, I2C and PMBUS drives of a VR are fused first to generate a new fused drive, and the drive is named after a new configuration word (matching word) for matching in a device tree. An adapter may be constructed in the drive to enable a superior bus to access the two links. Then, two addresses are generated according to a chip specification for I2C and PMBUS to use respectively. An initial address and an offset are generated according to the two addresses. Specifically, the smaller one of the two addresses for I2C and PMBUS is determined as the initial address, and the corresponding offset is computed, such that a value of the initial address plus the offset is equal to the other address.

Figure 2:
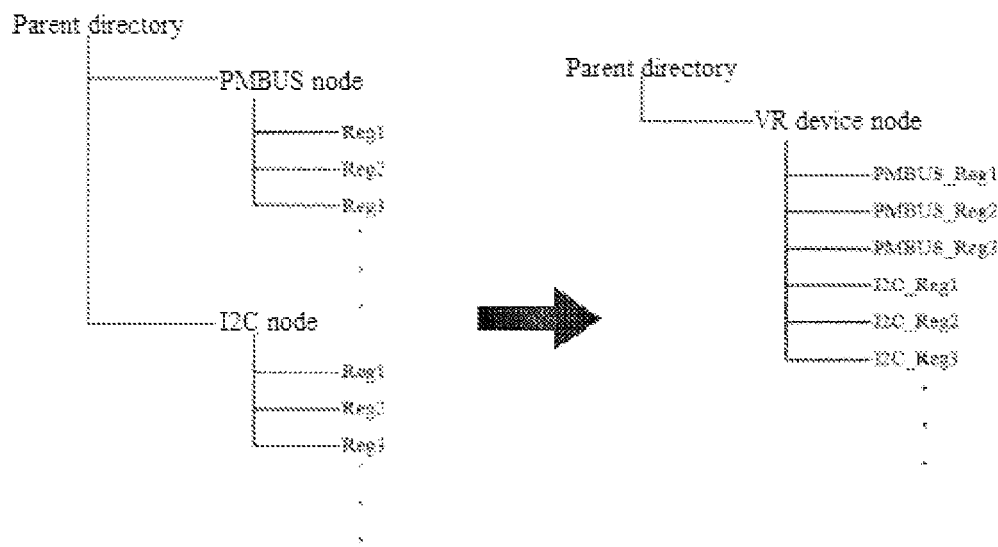
FIG. 2 is a schematic diagram of a device tree constructed in an embodiment of a method for multi-bus device fused access according to the present application.

During specific device access, only a fused node is constructed for the device (VR chip) in an upper-layer user space, as shown in FIG. 2, wherein Reg represents the register. A user only needs to give an instruction for accessing the fused node according to the new matching word, and the initial address and offset corresponding to the device. Then, in step S1, the bus receives the instruction for accessing the fused node of the device, wherein the instruction contains the matching word, the initial address, and the offset. After the instruction for access is received, in step S2, the new fused drive is matched from various drives of the bus according to the matching word, and the fused drive is activated. In step S3, the initial address and the offset are acquired from the instruction on the bus respectively based on a format, etc., specified in the fused drive. Then, in step S4, an address of a first bus of the device is computed according to the initial address, and an address of a second bus of the device is computed according to the initial address and the offset. That is, the original addresses corresponding to the two links of the device are recovered according to the initial address and the offset. Finally, in step S5, the device is accessed according to the address of the first bus so as to acquire first information, and the device is accessed according to the address of the second bus so as to acquire second information. The first information and the second information are version information or state information respectively. Preferably, the first information is version information, and the second information is state information.

In some embodiments of the method for multi-bus device fused access of the present application, the address of the first bus is an I2C bus address of the device, and the address of the second bus is a PMBUS address of the device. In an existing I2C bus and PMBUS, an I2C bus address is generally smaller than a PMBUS address. Therefore, the address of the first bus obtained according to the fused drive is preferably an I2C bus address of the device, and the address of the second bus obtained according to the fused drive is preferably a PMBUS address of the device.

In some embodiments of the method for multi-bus device fused access of the present application, the operation in step S2 that matching is performed according to the matching word and a fused drive is activated further includes that: the fused drive is matched from multiple drives of the bus according to the matching word, and an adapter of the fused drive is activated to associate the bus with the first bus and the second bus. In order to achieve higher compatibility of the method of the present application, the method of the present application is additionally used for an existing bus, namely the fused drive is added to various existing drives of the bus. Therefore, when the bus receives the instruction for accessing the fused node, which instruction is given by the user based on the method for multi-bus device fused access of the present application, the fused drive may be matched from multiple drives of the bus according to the matching word in the instruction, and then an adapter of the fused drive is activated to associate the bus with the first bus and the second bus, namely enabling the bus to access the two links.

In some embodiments of the method for multi-bus device fused access of the present application, the operation in step S3 that the fused drive acquires the initial address and the offset from the instruction on the bus respectively further includes that: the initial address and the offset are acquired from the bus according to a structure specified in the fused drive respectively; and the acquired initial address and offset are written to corresponding positions of the structure. The fused drive includes a structure defining how the bus acquires the initial address and the offset and how to compute the address of the first bus and the address of the second bus according to the initial address and the offset. Therefore, after the fused drive of the bus is activated, the initial address and the offset may be acquired from the bus according to the structure specified in the fused drive respectively, and the acquired initial address and offset are written to corresponding positions of the structure, to compute the address of the first bus and the address of the second bus according to the definition of the structure.

In some embodiments of the method for multi-bus device fused access of the present application, the operation in step S4 that an address of a first bus of the device is computed according to the initial address and an address of a second bus of the device is computed according to the initial address and the offset further includes that: a value of the initial address is assigned to the address of the first bus; and a value of the initial address plus the offset is assigned to the address of the second bus. Preferably, the value of the initial address corresponds to the original I2C link address of the device, and the value of the initial address plus the offset corresponds to the original PMBUS link address of the device.

In another aspect, the present application also discloses an apparatus for multi-bus device fused access, including: at least one processor; and a memory, storing a program instruction executable by the processor. The program instruction is executed by the processor to implement the following steps:

S1: receiving, by a bus, an instruction for accessing a fused node of a device, wherein the instruction containing a matching word, an initial address, and an offset;

S2: performing matching according to the matching word and activating a fused drive; S3: acquiring, by the fused drive, the initial address and the offset from the instruction on the bus respectively;

S4: computing an address of a first bus of the device according to the initial address, and computing an address of a second bus of the device according to the initial address and the offset; and S5: accessing the device according to the address of the first bus so as to acquire first information, and accessing the device according to the address of the second bus so as to acquire second information.

In some embodiments of the apparatus for multi-bus device fused access of the present application, the address of the first bus is an I2C bus address of the device, and the address of the second bus is a PMBUS address of the device.

In some embodiments of the apparatus for multi-bus device fused access of the present application, the step S2 of performing matching according to the matching word and activating a fused drive further includes: matching the fused drive from multiple drives of the bus according to the matching word, and activating an adapter of the fused drive to associate the bus with the first bus and the second bus.

In some embodiments of the apparatus for multi-bus device fused access of the present application, the step S3 of acquiring, by the fused drive, the initial address and the offset from the instruction on the bus respectively further includes: acquiring the initial address and the offset from the bus according to a structure specified in the fused drive respectively; and writing the acquired initial address and the acquired offset to corresponding positions of the structure.

In some embodiments of the apparatus for multi-bus device bused access of the present application, the step S4 of computing an address of a first bus of the device according to the initial address and computing an address of a second bus of the device according to the initial address and the offset further includes: assigning a value of the initial address to the address of the first bus; and assigning a value of the initial address plus the offset to the address of the second bus.

The apparatus, device, etc., disclosed in the embodiments of the present application may be various electronic terminal devices such as a mobile phone, a Personal Digital Assistant (PDA), a tablet (PAD), and a smart television, or may be a large terminal device such as a server. Therefore, the scope of protection disclosed in the embodiments of the present application should not be limited to apparatuses and devices of a specific type. The client disclosed in the embodiments of the present application may be applied to any above-mentioned electronic terminal device in the form of electronic hardware, computer software, or a combination thereof.

The computer-readable storage medium (such as a memory) herein may be a volatile memory or a nonvolatile memory, or may include both a volatile memory and a nonvolatile memory. As an example rather than a restriction, the nonvolatile memory may include a Read-Only Memory (ROM), a Programmable ROM (PROM), an Electrically PROM (EPROM), an Electrically EPROM (EEPROM), or a flash memory. The volatile memory may include a Random Access Memory (RAM) that may be used as an external cache memory. As an example rather than a restriction, the RAM may be obtained in various forms, such as a Synchronous RAM (SRAM), a Dynamic RAM (DRAM), a Synchronous DRAM (SDRAM), a Double Data Rate SDRAM (DDR SDRAM), an Enhanced SDRAM (ESDRAM), a Synchronous Link DRAM (SLDRAM), and a Direct Rambus RAM (DRRAM). The memory device in the disclosed aspect is intended to include, but not limited to, these or other proper types of memories.

With the above technical solution, the present application at least has the following beneficial effects. I2C and PMBUS link addresses of a VR chip are fused together by use of an initial address and an offset, and a correspondingly developed fused drive ensures that the same device is only regarded as one device in a device tree of a bus and that desired information is obtained from different links respectively through an instruction for accessing a single node, i.e., a single device in the device tree of the bus.

It is to be understood that the technical features listed above for different embodiments may be combined if technically possible, thereby forming other embodiments within the scope of the present application. In addition, the specific examples and embodiments mentioned herein are nonrestrictive, and corresponding modifications may be made to the above-described structures, steps, and sequences without departing from the scope of protection of the present application.

In the present application, the adversative conjunctions are intended to include conjunctions. The definite or indefinite article is not intended to indicate the cardinal number. Specifically, "the" object or "one" and "an" object is intended to represent a possible object in multiple such objects. However, the element disclosed in the embodiments of the present application may be described or required in an individual form, but may be understood as a plural form, unless clearly limited to a singular form. In addition, conjunction "or" is used to describe co-existing features rather than mutually exclusive solutions. In other words, conjunction "or" is understood as including "and/or". Term "include" is inclusive, and has the same scope as "contain".

The above-mentioned embodiment, particularly any "preferred" embodiment, is a possible example of implementation mode only for understanding the principle of the present application clearly. Various variations and modifications may be made to the above-mentioned embodiment substantially without departing from the spirit and principle of the technology described herein. All modifications are intended to be included in the scope of the present disclosure.

What is claimed is:

1. A method for multi-bus device fused access, comprising following steps:
   receiving, by a bus, an instruction for accessing a fused node of a device, wherein the instruction contains a matching word, an initial address, and an offset;
   performing matching according to the matching word and activating a fused drive; wherein the fused drive comprises an adapter configured to enable a superior bus to access two links;
   acquiring, by the fused drive, the initial address and the offset from the instruction on the bus respectively;
   computing an address of a first bus of the device according to the initial address, and computing an address of a second bus of the device according to the initial address and the offset; and
   accessing the device according to the address of the first bus so as to acquire first information, and accessing the device according to the address of the second bus so as to acquire second information.

2. The method according to claim 1, wherein the address of the first bus is an Inter-Integrated Circuit (I2C) bus address of the device, and the address of the second bus is a Power Management Bus (PMBUS) address of the device.

3. The method according to claim 1, wherein the step of performing matching according to the matching word and activating the fused drive further comprises:
   matching the fused drive from multiple drives of the bus according to the matching word, and activating an adapter of the fused drive to associate the bus with the first bus and the second bus.

4. The method according to claim 1, wherein the step of acquiring, by the fused drive, the initial address and the offset from the instruction on the bus respectively further comprises:
   acquiring the initial address and the offset from the bus according to a structure specified in the fused drive respectively; and
   writing the acquired initial address and the acquired offset to corresponding positions of the structure.

5. The method according to claim 1, wherein the step of computing the address of the first bus of the device according to the initial address and computing the address of the second bus of the device according to the initial address and the offset further comprises:
   assigning a value of the initial address to the address of the first bus; and
   assigning a value of the initial address plus the offset to the address of the second bus.

6. The method according to claim 2, wherein a power control register and version information register of an existing Voltage Regulator (VR) chip are set under PMBUS and an I2C links respectively.

7. The method according to claim 6, wherein the PMBUS link and the I2C link are completely fused into one node.

8. The method according to claim 7, wherein the fused node includes a register of state information for monitoring a monitored voltage, current, and temperature, and further includes a register of needed version information.

9. The method according to claim 8, wherein I2C and PMBUS drives of a VR are fused first to generate a new fused drive, and the new fused drive is named after a new configuration word (matching word) for matching in a device tree.

10. The method according to claim 5, wherein the value of the initial address corresponds to an original I2C link address of the device, and the value of the initial address plus the offset corresponds to an original PMBUS link address of the device.

11. An apparatus for multi-bus device fused access, comprising:
at least one processor; and
a memory, storing a computer-readable instruction executable by the at least one processor, wherein the computer-readable instruction is executed by the at least one processor to implement following steps:
receiving, by a bus, an instruction for accessing a fused node of a device, wherein the instruction contains a matching word, an initial address, and an offset;
performing matching according to the matching word and activating a fused drive; wherein the fused drive comprises an adapter configured to enable a superior bus to access two links;
acquiring, by the fused drive, the initial address and the offset from the instruction on the bus respectively;
computing an address of a first bus of the device according to the initial address, and computing an address of a second bus of the device according to the initial address and the offset; and
accessing the device according to the address of the first bus so as to acquire first information, and accessing the device according to the address of the second bus so as to acquire second information.

12. The apparatus according to claim 11, wherein the address of the first bus is an Inter-Integrated Circuit (I2C) bus address of the device, and the address of the second bus is a Power Management Bus (PMBUS) address of the device.

13. The apparatus according to claim 11, wherein the step of performing matching according to the matching word and activating the fused drive further comprises:
matching the fused drive from multiple drives of the bus according to the matching word, and activating an adapter of the fused drive to associate the bus with the first bus and the second bus.

14. The apparatus according to claim 11, wherein the step of acquiring, by the fused drive, the initial address and the offset from the instruction on the bus respectively further comprises:
acquiring the initial address and the offset from the bus according to a structure specified in the fused drive respectively; and
writing the acquired initial address and the acquired offset to corresponding positions of the structure.

15. The apparatus according to claim 11, wherein the step of computing the address of the first bus of the device according to the initial address and computing the address of the second bus of the device according to the initial address and the offset further comprises:
assigning a value of the initial address to the address of the first bus; and
assigning a value of the initial address plus the offset to the address of the second bus.

16. The apparatus according to claim 12, wherein a power control register and version information register of an existing Voltage Regulator (VR) chip are set under PMBUS and an I2C links respectively.

17. The apparatus according to claim 16, wherein the PMBUS link and the I2C link are completely fused into one node.

18. The apparatus according to claim 17, wherein the fused node includes a register of state information for monitoring a monitored voltage, current, and temperature, and further includes a register of needed version information.

19. The apparatus according to claim 18, wherein I2C and PMBUS drives of a VR are fused first to generate a new fused drive, and the new fused drive is named after a new configuration word (matching word) for matching in a device tree.

20. The apparatus according to claim 15, wherein the value of the initial address corresponds to an original I2C link address of the device, and the value of the initial address plus the offset corresponds to an original PMBUS link address of the device.

* * * * *